(12) United States Patent
Enslow et al.

(10) Patent No.: US 11,938,679 B2
(45) Date of Patent: Mar. 26, 2024

(54) 3D PRINTING SYSTEM WITH WASTE COLLECTION SUBSYSTEM

(71) Applicant: 3D Systems, Inc., Rock Hill, SC (US)

(72) Inventors: Andrew Enslow, Escondido, CA (US); Darold Tejero Lazatin, San Marcos, CA (US)

(73) Assignee: 3D SYSTEMS, INC., Rock Hill, SC (US)

( * ) Notice: Subject to any disclaimer, the term of this patent is extended or adjusted under 35 U.S.C. 154(b) by 167 days.

(21) Appl. No.: 17/848,479

(22) Filed: Jun. 24, 2022

(65) Prior Publication Data
US 2023/0415418 A1 Dec. 28, 2023

Related U.S. Application Data

(60) Provisional application No. 63/215,165, filed on Jun. 25, 2021.

(51) Int. Cl.
*B29C 64/35* (2017.01)
*B29C 64/232* (2017.01)
(Continued)

(52) U.S. Cl.
CPC ............ *B29C 64/35* (2017.08); *B29C 64/232* (2017.08); *B29C 64/255* (2017.08); *B33Y 30/00* (2014.12); *B33Y 40/00* (2014.12)

(58) Field of Classification Search
CPC ... B29C 64/124; B29C 64/129; B29C 64/135; B29C 64/35; B29C 64/357; B29C 64/245
See application file for complete search history.

(56) References Cited

U.S. PATENT DOCUMENTS

| 10,668,665 | B2 | 6/2020 | Damiano et al. |
| 2019/0152136 | A1* | 5/2019 | Enslow ................. B29C 64/40 |
| 2021/0362404 | A1* | 11/2021 | Madelone, Jr. ....... B29C 64/255 |

FOREIGN PATENT DOCUMENTS

| EP | 3415314 A1 | 12/2018 |
| EP | 3639952 A1 | 4/2020 |

OTHER PUBLICATIONS

PCT International Search Report for International Search Authority for PCT/US2022/034820, dated Oct. 5, 2022 (6 pages).

(Continued)

*Primary Examiner* — Timothy Kennedy
*Assistant Examiner* — Ariella Machness

(57) ABSTRACT

A three-dimensional (3D) printing system includes a resin vessel, a fabrication subsystem, a waste collection subsystem, and a controller. The resin vessel is configured to contain photocurable resin. The fabrication subsystem is configured to form the 3D article with layer-by-layer selective curing of the photocurable resin. The fabrication subsystem includes a build plate, a build plate support structure, and a vertical movement mechanism. The waste collection subsystem is attached to the build plate support structure and configured to capture partially polymerized resin as the build plate support structure moves in an upward direction. The controller is configured to (a) operate the vertical movement mechanism to translate the build plate support structure to a lower position and (b) operate the vertical movement mechanism to raise the waste collection subsystem up through the resin and to a position at which partially polymerized resin can be unloaded from the waste collection subsystem.

11 Claims, 3 Drawing Sheets

(51) Int. Cl.
*B29C 64/255* (2017.01)
*B33Y 30/00* (2015.01)
*B33Y 40/00* (2020.01)

(56) References Cited

OTHER PUBLICATIONS

PCT Written Opinion for International Search Authority for PCT/US2022/034820, dated Oct. 5, 2022 (6 pages).

* cited by examiner

3D PRINTING SYSTEM WITH WASTE COLLECTION SUBSYSTEM

CROSS-REFERENCE TO RELATED APPLICATIONS

This non-provisional patent application claims priority to U.S. Provisional Application Ser. No. 63/215,165, Entitled "3D Printing System with Waste Collection Subsystem" by Andrew Enslow et al., filed on Jun. 25, 2021, incorporated herein by reference under the benefit of U.S.C. 119(e).

FIELD OF THE INVENTION

The present disclosure concerns an apparatus and method for the digital fabrication of three-dimensional (3D) articles by a layer-by-layer solidification of a liquid photocurable build material. More particularly, the present invention concerns a solution to a problem of partially cured photocurable build material building up in a resin vessel.

BACKGROUND 3D printing systems are in wide use for prototyping and manufacturing articles. One type of 3D printing system utilizes a process called stereolithography. A typical stereolithography system utilizes a resin vessel, an imaging system, and a build plate within liquid photocurable resin held by the resin vessel. A three-dimensional (3D) article is manufactured in a layer-by-layer manner by selectively imaging and solidifying layers of the photocurable resin over the build plate using radiation. As the 3D article is fabricated stray radiation can result in unintended partial curing of the photocurable resin that is not part of the 3D article. The partially curing will then tend to propagate into the resin even in the absence of radiation. Over time the resin becomes unusable and is then replaced at high cost and a waste of material.

SUMMARY

Figure 1:
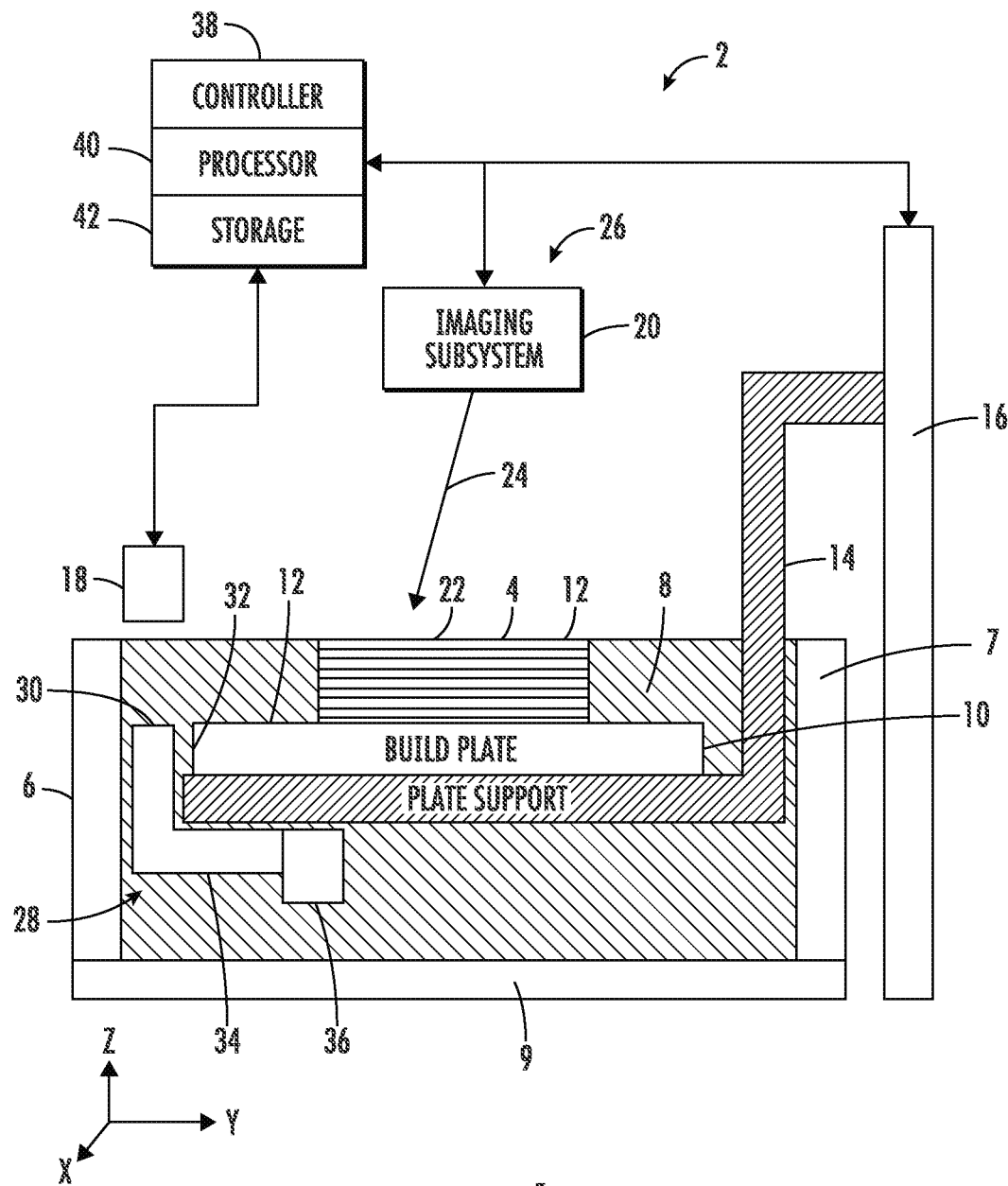
FIG. 1 is a schematic diagram of a three-dimensional (3D) printing system.

In a first aspect of the disclosure, a three-dimensional (3D) printing system is configured to manufacture a three-dimensional 3D article in a layer-by-layer manner. In a manufacturing mode, the 3D printing system forms a vertical stack of plural layers by the selective polymerization of individual layers. The 3D printing system includes a resin vessel, a fabrication subsystem, a waste collection subsystem, and a controller. The resin vessel is configured to contain photocurable resin. The fabrication subsystem is configured to form the 3D article with layer-by-layer selective curing of the photocurable resin. The fabrication subsystem includes a build plate, a build plate support structure, and a vertical movement mechanism. The waste collection subsystem is attached to the build plate support structure and configured to capture partially polymerized resin as the build plate support structure moves in an upward direction. The controller is configured to (a) operate the vertical movement mechanism to translate the build plate support structure to a lower position and (b) operate the vertical movement mechanism to raise the waste collection subsystem up through the resin and to a position at which partially polymerized resin can be unloaded from the waste collection subsystem. The waste collection subsystem enables automated and convenient way to clean debris and partially polymerized resin clumps from the resin vessel.

In one implementation, the resin vessel has walls defining a generally rectangular lateral vessel area for containing the photocurable resin. The build plate has a generally rectangular lateral extent that occupies a majority of the vessel area with a rectangular gap between the build plate and a wall of the vessel. The waste collection subsystem includes an intake that is positioned within the rectangular gap. As the build plate rises, a portion of the resin flows into the intake. With a perforated build plate and the intake occupying a majority of the rectangular gap and a sufficient speed of raising the waste collection subsystem, the vast majority of resin that passes by the build plate will pass through the waste collection subsystem. Thus, this implementation allows a high degree of removal of debris and partially polymerized resin.

In another implementation, the waste collection subsystem includes an intake that is supported along an edge of the build plate and a sieve container that is supported under the build plate. A conduit couples the intake to the sieve container. The intake is wider than the conduit. The resin enters the intake vertically and then bends 90 degrees along the conduit before passing into the sieve container. The debris and partially polymerized resin are trapped in the sieve container. The conduit includes a check valve to prevent resin from backflowing from the sieve container to the intake. The sieve container can be easily removed and replaced to facilitate removal of the debris and partially polymerized resin from the resin vessel.

In a second aspect of the disclosure, three-dimensional (3D) printing system is configured to manufacture a three-dimensional 3D article in a layer-by-layer manner. The 3D printing system includes a vessel, a fabrication subsystem, and waste collection subsystem, and a controller. The vessel is configured to contain photocurable resin. The vessel includes at least one wall that defines a wall boundary that laterally encloses the photocurable resin. The fabrication subsystem includes a build plate, a build plate support structure, and a vertical movement mechanism. A lateral gap is defined between the build plate and the wall boundary. The waste collection subsystem includes an intake fluidically coupled to a sieve container. The intake is laterally positioned within the gap. The controller is configured to operate the vertical movement mechanism to translate the build plate and the waste collection subsystem up through the photocurable resin and to induce fluid flow of the photocurable resin through the intake and into the sieve container as the build plate is raised.

In various implementations the wall boundary can be circular, elliptical, polygonal, square, rectangular, or irregular. In a particular implementation, the at least one wall includes four walls and the wall boundary is rectangular.

DETAILED DESCRIPTION OF THE PREFERRED EMBODIMENTS

FIG. 1 is a schematic diagram of a three-dimensional (3D) printing system 2 for manufacturing a 3D article 4. In describing system 2, mutually orthogonal axes X, Y, and Z will be utilized and otherwise referred to as an X-axis, a Y-axis, and a Z-axis. Axes X and Y are lateral axes that are generally horizontal. The Z-axis is a vertical axis that is generally aligned with a gravitational reference. The term "generally" implies that a direction or magnitude is not necessarily exact but is by design. Thus the term "generally horizontal" means horizontal (perpendicular to a gravitational vector) to within design and manufacturing tolerances. The term "generally aligned" means aligned to within design and manufacturing tolerances.

3D printing system 2 includes a resin vessel 6 for containing a photocurable resin 8. In the illustrated embodiment, photocurable resin 8 includes, inter alia, a monomer, a catalyst, and a filler. The catalyst allows the resin 8 to be hardened and cured with an application of radiation such as blue radiation, violet radiation, or ultraviolet radiation that would typically have a wavelength of less than about 450 nanometers (nm). The resin vessel 6 includes at least one outer vertical wall 7 joined to a lower wall 9 for containing the resin 8. In the illustrated embodiment, the at least one outer wall 7 can includes four outer walls 7 to laterally contain the resin 8 within a rectangular area. Alternatively, the at least one outer wall 7 can be a single wall defining an oval, circular, or other closed shapes for containing the resin 8.

System 2 includes a build plate 10 with an upper surface 12 upon which the 3D article 4 is formed. A build plate support structure 14 supports build plate 10. A vertical movement mechanism 16 is operable to vertically position the build plate support structure 14 and in doing so vertically position the build plate 10. In one embodiment, the vertical movement mechanism 16 includes a fixed motor coupled to a lead screw. The build plate support structure 14 includes a threaded bearing that receives the lead screw. As the motor turns the lead screw, the effect is to translate the build plate support structure 14 up or down.

System 2 includes a material coating subsystem 18 configured to form a thin layer of resin at the upper surface 12 of build plate 18 or the 3D article 4. In one embodiment, the material coating subsystem 18 includes a rubber wiper that is translated along the lateral Y-axis. The material coating subsystem 18 can include a lateral movement mechanism such as a lead screw (similar to that described for the vertical movement mechanism 16) or motor driven belt that provides movement and positioning of the wiper along Y. Such lateral movement mechanisms are known in the art for applications such as conventional scanners and printers.

System 2 includes an imaging subsystem 20 for selectively hardening a layer of the photocurable resin 8 at a build plane 22. In the illustrated embodiment, the imaging system 20 generates a radiation beam 24 that scans along the build plane 22. The imaging system 20 includes a laser that generates the radiation beam 24 and a pair of galvanometer mirrors for scanning the radiation beam across the build plane 22 along X and Y. The build plate 10, the build plate support structure 14, the vertical movement mechanism 16, the material coating subsystem 18, and the imaging subsystem 20 are collectively referred to as a fabrication subsystem 26.

System 2 includes a waste collection subsystem 28 that is configured to remove partially polymerized material and fragments from the photocurable resin 8 during an upward motion of the build plate 10. The waste collection subsystem 28 is mechanically coupled to the build plate support structure 14. The waste collection subsystem 28 includes an intake 30 that is positioned proximate to an edge 32 of build plate 10. The waste collection subsystem 28 includes a conduit 34 that fluidically couples the intake 30 to a sieve container 36.

A controller 38 includes a processor 40 coupled to a non-volatile or non-transient information storage device 42. The processor 40 can otherwise be referred to as a processing unit (PU) or central processing unit (CPU) as are known in the art of computing technology. The non-transient information storage device 42 can include one or more of flash memory and other mass storage devices such as a magnetic disc drive both of which are known in the art of computing technology. The storage device 42 stores software instructions. The controller 38 is configured to operate the fabrication subsystem 26 as the processor 40 executes the software instructions.

The controller 38 is configured to remove polymerized material and fragments from the vessel 6 with the following actions: (A) The controller 38 operates the vertical movement mechanism 16 to lower the waste collection subsystem 28 into the vessel 6. This can be part of a fabrication process or it can be solely for the purpose of operating the waste collection subsystem 28. (B) The controller 38 operates the vertical movement mechanism 16 to raise the waste collection subsystem 28. As the waste collection subsystem 28 is raised photocurable resin 8 passes into the intake 30, through the conduit 34, and through the sieve container 36. Clumps of partially polymerized material and fragments are trapped and accumulate in the sieve container 36. (C) The waste collection subsystem 28 is raised to allow the sieve container 36 to be removed and replaced as needed.

The controller 38 is configured to fabricate or manufacture the 3D article 4 with the following steps: (a) the controller 38 operates the vertical movement mechanism 16 to position the upper surface 12 (of build plate 10 or previously imaged portion of 3D article 4) proximate to build plane 22, (b) the controller 38 operates the coating subsystem 18 to form a new layer of the photocurable resin 8 over the upper surface 12, (c) the controller 38 operates the imaging subsystem 20 to selectively cure and harden the new layer of photocurable resin 8, repeat (a)-(c) to complete manufacture of the 3D article 4.

Figure 2:
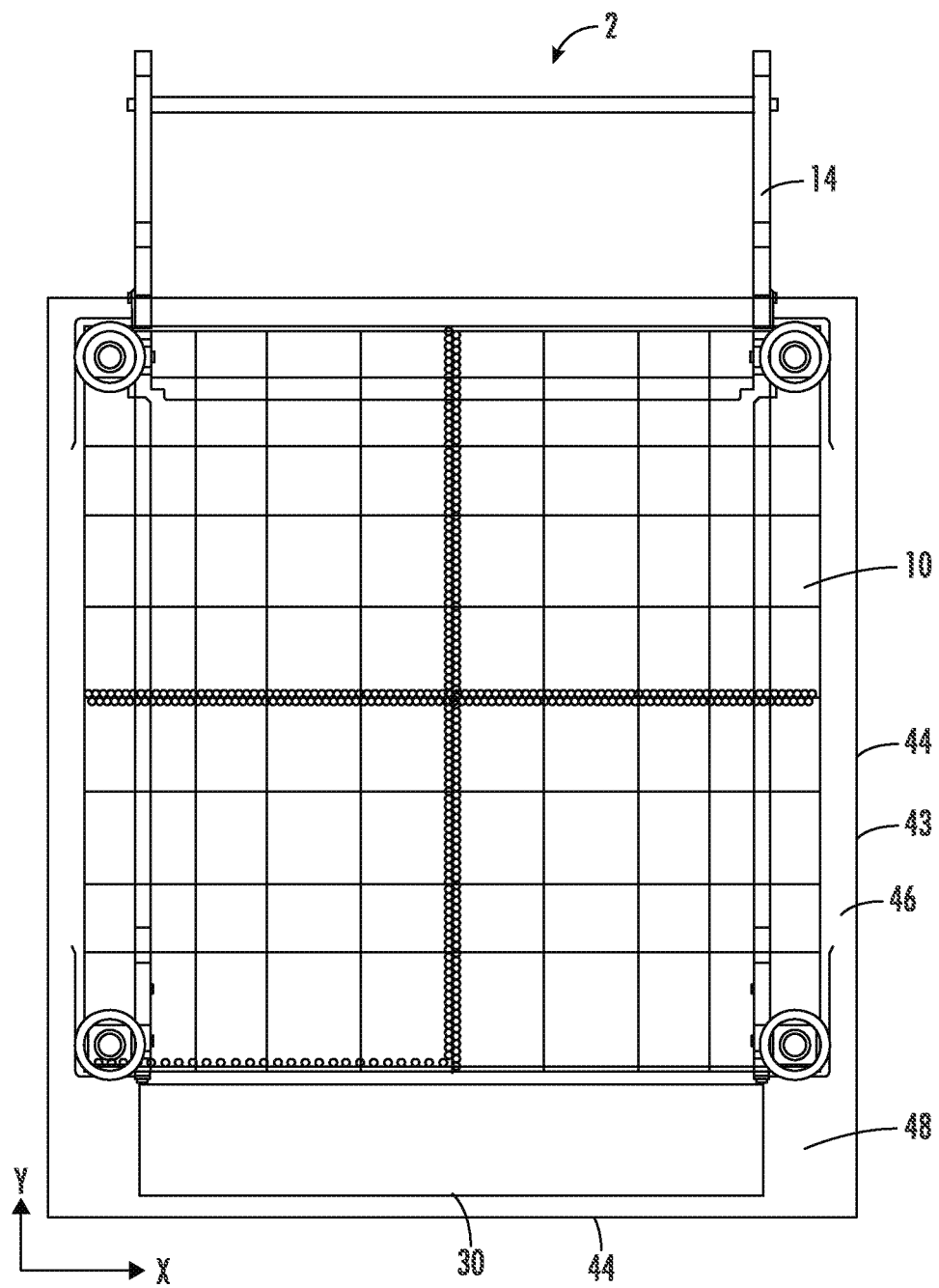
FIG. 2 is a schematic plan view of a portion of a 3D printing system.

FIG. 2 is a schematic plan view of a portion of system 2. The at least one wall 7 has an inner surface 43 contacting the resin 8 thus defining a wall boundary 44 around the resin 8. In the illustrated embodiment, there are four inner surfaces 43 defining a generally rectangular lateral vessel area 46 for containing the photocurable resin 8. A rectangular gap 48 is laterally defined between the wall boundary 44 and the build plate 10. The intake 30 of the waste collection subsystem 28 is positioned in the rectangular gap 48. As the waste collection subsystem 28 is raised through the vessel 6, a large percentage of the resin 8 flows into the intake 30 allowing for efficient removal of the partially polymerized resin material and fragments. In the illustrated embodiment, the intake 30 has a major axis that is generally aligned with the X-axis and with a major axis of the rectangular gap 48.

In alternative embodiments, the at least one wall 7 define a single sided wall boundary 44 that is circular, oval, or has some other continuous shape. In other alternatives, the wall boundary 44 can be triangular, polygonal or irregular in shape thus having two, three, five, six or more sides. For any of these alternative embodiments, there is a lateral gap 48 defined between the wall boundary and the build plate 10. The intake 30 of the waste collection subsystem 28 is positioned within the gap 48, regardless of shape. The intake 30 can have a lateral geometry that optimally covers a portion of the gap 48. Ideally, the intake 30 matches a geometry of the gap 48 as closely as possible to maximize capture of partially cured resin and debris as the intake 30 is translated upward.

Figure 3A:
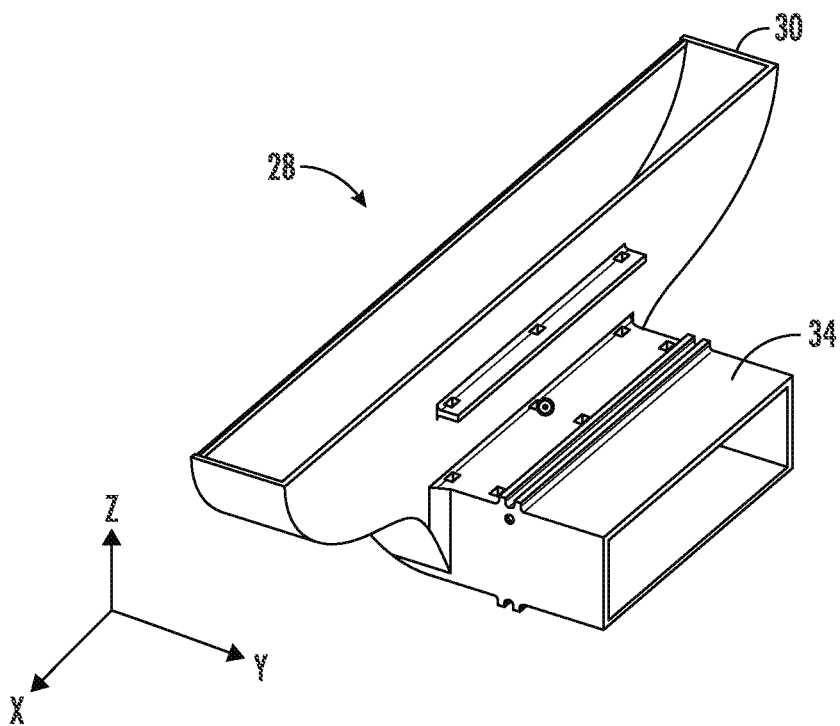
FIG. 3A is an isometric view of a waste collection subsystem.
Figure 3B:
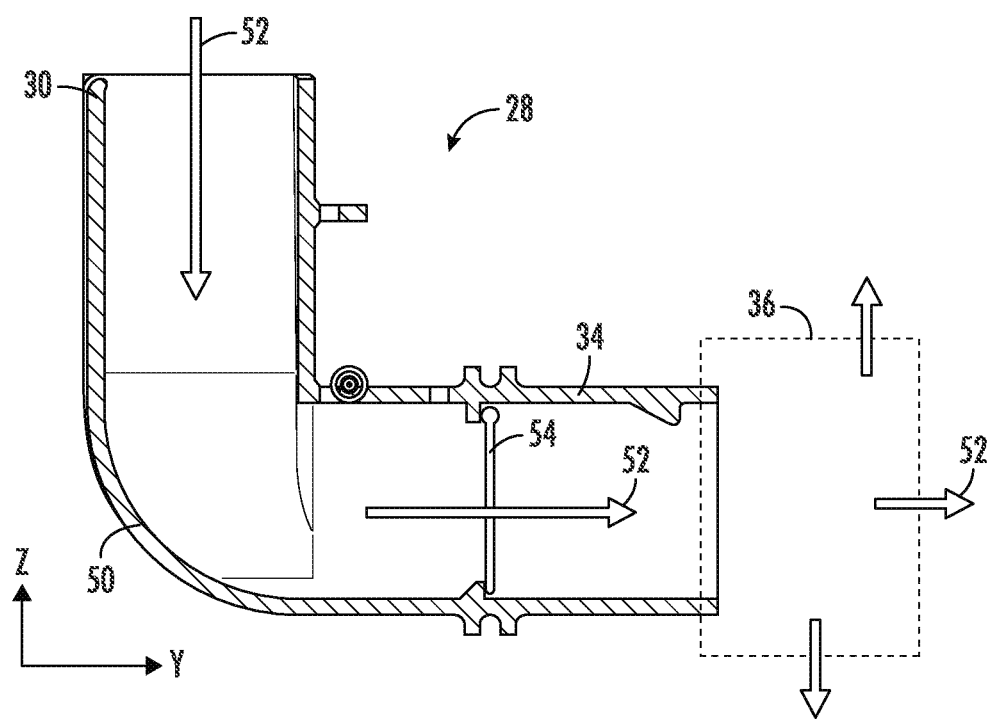
FIG. 3B is a sectional view of a waste collection subsystem.

FIG. 3A is an isometric view of a portion of an embodiment of the waste collection subsystem 28. The waste collection subsystem 28 is mechanically coupled onto an end and lower side of the build plate support structure 14. FIG. 3B is a side sectional view through the waste collection subsystem 28. Between the intake 30 and the conduit 34 is a bend 50. Arrows 52 indicate a fluid path of resin 8 as it flows through and out of the waste collection subsystem 28. As the waste collection subsystem 28 is translated upward (+Z) through resin 8 the resin (a) enters the intake 30 along the Z-axis, (b) flows through a 90 degree bend through the bend 50, (c) through conduit 34 to the sieve container 36, and (d) through small pores or openings in the sieve container 36. In one embodiment, sieve container 36 is a replaceable bag.

The conduit 34 includes a check valve 54. Check valve 54 is configured to open to allow the flow of resin through the conduit 34 as the waste collection subsystem 28 is translated upward but to otherwise close to prevent backflow. Thus the waste material captured in the sieve container 36 will not backflow into the resin vessel 6 when the waste collection subsystem 28 is not being translated upward.

The specific embodiments and applications thereof described above are for illustrative purposes only and do not preclude modifications and variations encompassed by the scope of the following claims.

What is claimed:

1. A three-dimensional (3D) printing system for manufacturing a 3D article comprising:
    a vessel configured to contain photocurable resin;
    a fabrication subsystem configured to form the 3D article with layer-by-layer selective curing of the photocurable resin, the fabrication subsystem includes:
        a build plate;
        a build plate support structure; and
        a vertical movement mechanism;
    a waste collection subsystem attached to the build plate support structure and configured to capture partially polymerized resin as the build plate support structure moves in an upward direction; and
    a controller configured to:
        operate the vertical movement mechanism to translate the build plate support structure to a lower position;
        operate the vertical movement mechanism to raise the waste collection subsystem up through the resin and to a position at which partially polymerized resin can be unloaded from the waste collection subsystem.

2. The three-dimensional (3D) printing system of claim 1 wherein the vessel has walls defining a generally rectangular lateral vessel area for containing the photocurable resin, the build plate having generally rectangular lateral extent that occupies a majority of the vessel area with a rectangular gap between the build plate and a wall of the vessel, the waste collection subsystem includes an intake that is positioned within the rectangular gap, as the build plate rises a portion of resin flows into the intake.

3. The three-dimensional (3D) printing system of claim 1 wherein the waste collection subsystem includes an intake that is supported along an edge of the build plate and a sieve container that is supported under the build plate, as the build plate rises resin flows into the intake and then through the sieve container.

4. The three-dimensional (3D) printing system of claim 3 wherein the intake is coupled to a conduit, the intake is relatively wider than the conduit, the conduit is coupled to the sieve container.

5. The three-dimensional (3D) printing system of claim 3 wherein the waste collection subsystem includes a conduit coupling the intake to the sieve container, as the build plate rises the resin flow vertically into the intake and then flows laterally from the conduit into the sieve container.

6. The three-dimensional (3D) printing system of claim 3 wherein the waste collection subsystem includes a conduit coupling the intake to the sieve container, the conduit including a check valve to prevent backflow of resin back out of the waste collection system when the build plate is not rising.

7. A method of operating a three-dimensional (3D) printing system that is configured to manufacturing a 3D article comprising:
    providing:
        a vessel configured to contain photocurable resin;
        a fabrication subsystem configured to form the 3D article with layer-by-layer selective curing of the photocurable resin, the fabrication subsystem includes;
        a build plate;
        a build plate support structure; and
        a vertical movement mechanism; and
        a waste collection subsystem attached to the build plate support structure and configured to capture partially polymerized resin as the build plate support structure moves in an upward direction;
    operating the vertical movement mechanism to translate the build plate support structure to a lower position; and
    operating the vertical movement mechanism to raise the waste collection subsystem up through the resin and to a position at which partially polymerized resin can be unloaded from the waste collection subsystem.

8. The method of claim 7 wherein the vessel has walls defining a generally rectangular lateral vessel area for containing the photocurable resin, the build plate having generally rectangular lateral extent that occupies a majority of the vessel area with a rectangular gap between the build plate and a wall of the vessel, the waste collection subsystem includes an intake that is positioned within the rectangular gap, as the build plate rises a portion of resin flows into the intake.

9. The method of claim 7 wherein the waste collection subsystem includes an intake that is supported along an edge of the build plate and a sieve container that is supported under the build plate, as the build plate rises resin flows into the intake and then through the sieve container.

10. The method of claim 9 wherein the waste collection subsystem includes a conduit coupling the intake to the sieve container, as the build plate rises the resin flow vertically into the intake and then flows laterally from the conduit into the sieve container.

11. The method of claim 9 wherein the waste collection subsystem includes a conduit coupling the intake to the sieve container, the conduit including a check valve configured to prevent backflow of resin back out of the waste collection system when the build plate is not rising.

* * * * *